United States Patent
Pushkar Devanahalli et al.

(10) Patent No.: US 12,353,439 B1
(45) Date of Patent: Jul. 8, 2025

(54) DEPLOYMENT TO CLUSTER GROUPS ACROSS MULTIPLE REGIONS

(71) Applicant: GM Cruise Holdings LLC, San Francisco, CA (US)

(72) Inventors: Fnu Pushkar Devanahalli, Bothell, WA (US); Jonathan Langefeld, Lathrop, CA (US); Stephen James Day, Kirkland, WA (US); Benjamin Flowers, Seattle, WA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/403,947

(22) Filed: Jan. 4, 2024

(51) Int. Cl.
*G06F 16/28* (2019.01)

(52) U.S. Cl.
CPC .................. *G06F 16/285* (2019.01)

(58) Field of Classification Search
CPC ..................................................... G06F 16/285
See application file for complete search history.

(56) References Cited

U.S. PATENT DOCUMENTS

| | | | |
|---|---|---|---|
| 11,409,820 B1* | 8/2022 | Gutierrez | G06F 16/9538 |
| 11,880,781 B2* | 1/2024 | Makhija | G06N 3/088 |
| 2018/0060411 A1* | 3/2018 | Kanuri | G06F 16/285 |
| 2018/0196867 A1* | 7/2018 | Wiesmaier | G06F 9/5038 |
| 2019/0171438 A1* | 6/2019 | Franchitti | G06N 3/08 |
| 2021/0365479 A1* | 11/2021 | Reimann | G06F 16/285 |
| 2022/0035800 A1* | 2/2022 | Dym | G06F 9/505 |
| 2022/0092064 A1* | 3/2022 | Bremer | G06F 16/2462 |
| 2022/0269957 A1* | 8/2022 | Rangan | G06F 16/285 |
| 2023/0065530 A1* | 3/2023 | Mohanty | H04L 41/082 |
| 2024/0289251 A1* | 8/2024 | Stipanovich | G06F 8/60 |

* cited by examiner

*Primary Examiner* — Jorge A Casanova
(74) *Attorney, Agent, or Firm* — Honigman LLP; Matthew H. Szalach; Jonathan P. O'Brien

(57) ABSTRACT

A company that develops software applications for operating and managing autonomous vehicles has an array of developer teams working on many different projects. Successful continuous delivery of software applications for the company can depend on reliability of the cluster infrastructure. Platform owners may be most knowledgeable when it comes to setting up cluster group that spans multiple regions. A developer working on a project can select, on a project management system, a cluster group for deployment of the project. A cluster group can specify a name for the cluster group, a plurality of environment-stack channels, and one or more clusters in deployment infrastructure associated with each environment-stack channel. The project management system can seamlessly provision resources for the project according to the selected cluster group.

20 Claims, 10 Drawing Sheets

DEPLOYMENT TO CLUSTER GROUPS ACROSS MULTIPLE REGIONS

TECHNICAL FIELD

The present disclosure generally relates to cluster infrastructure management and, more specifically, to dynamic permissions management for cloud workloads.

BACKGROUND

Cluster infrastructure can include hardware and software resources deployed to support systems with high availability, scalability, and performance. Systems can be deployed on the cluster infrastructure, and the cluster infrastructure enables the systems to service requests being made to the systems.

Autonomous vehicles (AVs), also known as self-driving cars, and driverless vehicles, may be vehicles that use multiple sensors to sense the environment and move without human input. Technology in AVs may enable vehicles to drive on roadways and to accurately and quickly perceive the vehicle's environment, including obstacles, signs, and traffic lights. AV technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected locations. The vehicles can also be used to pick-up packages and/or other goods and deliver the packages and/or goods to selected locations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

DETAILED DESCRIPTION

Figure 1:
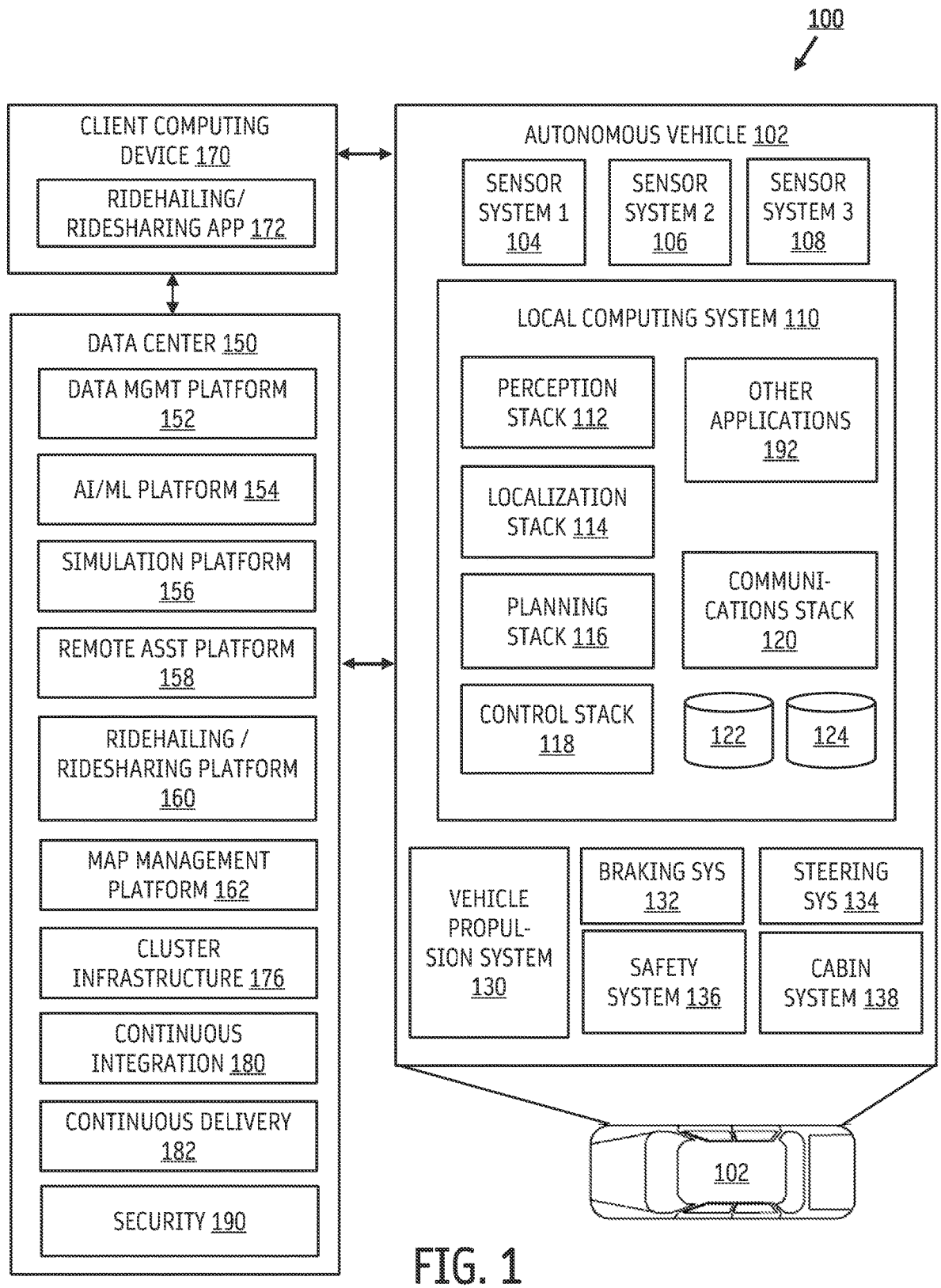
FIG. 1 illustrates an exemplary system that may be used to facilitate operations of one or more AVs, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

A company that develops software applications for operating and managing AVs has an array of developer teams working on many different projects. One developer team may be in charge of developing and deploying an application for processing sensor data on the AVs. One developer team may be in charge of developing and deploying an application for allowing voice calls in the AVs through microphones inside the AV. Another developer team may be in charge of developing a simulation application for testing an AV stack (involving perception, understanding, planning, and controls) in a computer-simulated environment. Another developer team may be in charge of developing the AV stack that is to be deployed on the AVs. Another developer team may be in charge of developing a web application to be used by users wanting to book a ride with an AV. Another developer team may be in charge of processing sensor data gathered by mapping vehicles. Another developer team may be in charge of developing software for embedded systems on the AV fleet. There may be many other developer teams working on other applications. Some software applications that support operations of an AV fleet can be implemented on and supported by cluster infrastructure. Some software applications that deal with operations of the AVs can be implemented on the AV fleet. Examples of such applications (and platforms) are described with FIG. 1.

Lifecycle of software applications involves many parts or steps from developer teams writing code to the deployment of software applications. To alleviate the burden from the developer teams having to manage the lifecycle and enforce rules between various parts or steps of end-to-end software development, continuous integration (CI) and continuous delivery (CD) systems can be implemented to automate and streamline the software development lifecycle. CI/CD systems can involve and execute complex pipelines. A pipeline for an application can include parts or steps, such as, code testing, integration testing, building, build testing, updating, deploying, and monitoring the application. Different CI/CD systems may be tasked to execute a part of the pipeline for the application on a namespace for the developer team (e.g., a particular namespace that the developer team is allowed to access), and to manage the execution (e.g., monitor the progress of the part of the pipeline).

An example of a CI/CD system is a deployment manager that can manage application definitions, configurations, environments, stacks, and version control. The deployment manager can streamline application deployment on the cloud and monitor the deployment while the application is running on a cloud. The deployment manager may manage the roll out of different parts of a deployment, e.g., gating and/or promoting an application of a project from one environment-stack (or channel) to another.

For many cloud-native applications, different developer teams may be utilizing or performing actions on shared infrastructure of the company, e.g., multi-tenancy cluster infrastructure, or the AV fleet where different developer teams may need to deploy and monitor the software applications on the AV fleet. Successful continuous delivery of software applications for the company can depend on reliability of the cluster infrastructure. Reliability of cluster infrastructure may depend on availability, disaster recovery, latency, and capabilities for complying with data regulations. Multi-region clusters can be used to increase reliability.

One technical challenge is to separate the concern of managing the multi-tenancy cluster infrastructure (e.g., enforcing deployment onto multi-region clusters) from the concern of the developer teams. Platform owners may be most knowledgeable when it comes to setting up a cluster group that spans multiple regions. Therefore, platform owners may be most suited to define cluster groups. A cluster group can specify a name for the cluster group, a plurality of environment-stacks or channels (e.g., "dev", "staging", "prod-rnd", "prod", etc.), and one or more clusters in deployment infrastructure associated with each environment-stack or channel (e.g., "paas-product-prod-rnd-us-west1", "paas-product-prod-rnd-us-west2", etc.).

A platform owner can edit information about various clusters in the deployment infrastructure in a cluster registry. A project management system can pull the information from the cluster registry and compile information about cluster groups.

A developer working on a project can select, on the project management system, a cluster group for deployment of the project. The developer does not create or design the multi-region cluster setup. Rather, the platform owner has already performed that task. After receiving the selection of the cluster group for the deployment of the project, the project management system can seamlessly provision resources for the project according to the selected cluster group. Resources may include namespaces, secrets, and workspaces on the deployment infrastructure.

When the project is ready to be deployed or promoted to a particular environment-stack or channel, the project management system can trigger deployment to the one or more clusters associated with the particular environment-stack or channel.

The platform owner can modify information about various clusters in the deployment infrastructure in the cluster registry. The project management system can pull the modified information to detect a change in the cluster group assigned to a project. The project management system can reconcile the change in the cluster group without intervention or input from the developer.

Exemplary AV Management System

To better understand the varied systems associated with AVs, FIG. 1 illustrates an exemplary AV management system 100 that may be used to facilitate AV operations, according to some aspects of the disclosed technology.

One of ordinary skill in the art will understand that, for the AV management system 100 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 may communicate with one another over one or more networks. AV may be a part of a fleet of AVs managed by system 100.

AV 102 may navigate about roadways without a human driver based on sensor signals generated by multiple sensor systems 104, 106, and 108. The sensor systems 104-108 may include different types of sensors and may be arranged about the AV 102. For instance, the sensor systems 104-108 may comprise Inertial Measurement Units (IMUs), cameras (e.g., still image cameras, video cameras, etc.), light sensors (e.g., light detection and ranging (LIDAR) systems, ambient light sensors, infrared sensors, etc.), radio detection and ranging (RADAR) systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, sensor system 104 may be a camera system, the sensor system 106 may be a LIDAR system, and the sensor system 108 may be a RADAR system. Other embodiments may include any other number and type of sensors.

AV 102 may also include several mechanical systems that may be used to maneuver or operate AV 102. For instance, mechanical systems may include vehicle propulsion system 130, braking system 132, steering system 134, safety system 136, and cabin system 138, among other systems. Vehicle propulsion system 130 may include an electric motor, an internal combustion engine, or both. The braking system 132 may include an engine brake, a wheel braking system (e.g., a disc braking system that utilizes brake pads), hydraulics, actuators, and/or any other suitable componentry configured to assist in decelerating AV 102. The steering system 134 may include suitable componentry configured to control the direction of movement of the AV 102 during navigation. Safety system 136 may include lights and signal indicators, a parking brake, airbags, and so forth. The cabin system 138 may include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 may include one or more client interfaces (e.g., graphical user interfaces (GUIs), Voice User Interfaces (VUIs), etc.) for controlling certain aspects of the mechanical systems 130-138.

AV 102 may additionally include a local computing system 110 that is in communication with the sensor systems 104-108, the mechanical systems 130-138, the data center 150, and the client computing device 170, among other systems. The local computing system 110 may include one or more processors and memory, including instructions that may be executed by the one or more processors. The instructions may make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing system 110 includes a perception stack 112, a mapping and localization stack 114, a planning stack 116, a control stack 118, a communication stack 120, an HD geospatial database 122, and an AV operational database 124, other applications 192, among other stacks and systems. Collectively, a perception stack 112, a mapping and localization stack 114, a planning stack 116, a control stack 118 of the local computing system 110 may provide functionalities of an AV stack.

Perception stack 112 may enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 may detect and classify objects and determine their current and predicted locations, speeds, directions, and the like. In addition, the perception stack 112 may determine the free space around the AV 102 (e.g., to maintain a safe distance from other objects, change lanes, park the AV, etc.). Perception stack 112 may also identify environmental uncertainties, such as where to look for moving objects, flag areas that may be obscured or blocked from view, and so forth.

Mapping and localization stack 114 may determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 may compare sensor data captured in real-time by the sensor systems 104-108 to data in the HD geospatial database 122 to determine its precise (e.g., accurate to the order of a few centimeters or less) position and orientation. The AV 102 may focus its search based on sensor data from one or more first sensor systems (e.g., GPS) by matching sensor data from one or more second sensor systems (e.g., LIDAR). If the mapping and localization information from one system is unavailable, the AV 102 may use mapping and localization information from a redundant system and/or from remote data sources.

Planning stack 116 may determine how to maneuver or operate the AV 102 safely and efficiently in its environment. For example, the planning stack 116 may receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 may determine multiple sets of one or more mechanical operations that the AV 102 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 may select from multiple backup plans to carry out. For example, while preparing to change lanes to turn right at an intersection, another vehicle may aggressively cut into the target lane, making the lane change unsafe. The planning stack 116 could have already determined an alternative plan for such an event, and upon its occurrence, help to direct the AV 102 to go around the block instead of blocking a current lane while waiting for an opening to change lanes.

Control stack 118 may manage the operation of the vehicle propulsion system 130, the braking system 132, the steering system 134, the safety system 136, and the cabin system 138. The control stack 118 may receive sensor signals from the sensor systems 104-108 as well as communicate with other stacks or components of the local computing system 110 or a remote system (e.g., the data center 150) to effectuate the operation of the AV 102. For example, control stack 118 may implement the final path or actions from the multiple paths or actions provided by the planning stack 116. The implementation may involve turning the routes and decisions (e.g., a trajectory) from the planning stack 116 into commands for the actuators that control the AV's steering, throttle, brake, and drive unit.

The communication stack 120 may transmit and receive signals between the various stacks and other components of the AV 102 and between the AV 102, the data center 150, the client computing device 170, and other remote systems. The communication stack 120 may enable the local computing system 110 to exchange information remotely over a network. The communication stack 120 may also facilitate local exchange of information, such as through a wired connection or a local wireless connection.

The HD geospatial database 122 may store HD maps and related data of the streets upon which the AV 102 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 124 may store raw AV data generated by the sensor systems 104-108 and other components of the AV 102 and/or data received by the AV 102 from remote systems (e.g., the data center 150, the client computing device 170, etc.). In some embodiments, the raw AV data may include HD LIDAR point cloud data, image or video data, RADAR data, GPS data, and other sensor data that the data center 150 may use for creating or updating AV geospatial data.

Data center 150 may include cluster infrastructure 176, continuous integration 180, continuous delivery 182, and security 190. In some cases, the data center 150 may include a plurality of data center facilities (e.g., buildings) in different physical locations.

Data center 150 may physically house cluster infrastructure 176. Cluster infrastructure 176 may include hardware resources and software resources. Hardware resources can include computing/processing resources, data storage resources, network resources, etc. Examples of computing/processing resources may include machine-learning processors (e.g., machine-learning accelerators or neural processing unit), central processing units (CPUs), graphics processing units (GPUs), quantum computers, etc. Examples of data storage resources may include disk storage devices, memory storage devices, database servers, etc. Network resources may include network appliances (e.g., switches, routers, etc.), network connections, interconnects, etc. Software resources may include firmware for the hardware resources, operating systems for the hardware resources, virtual machines running on the hardware resources, software that manage the hardware resources, etc. Cluster infrastructure 176 may include resources managed by one or more providers. Cluster infrastructure 176 may include a plurality of clusters. A cluster may include a group of nodes or compute resources networked together. A cluster may include a group of hardware resources and/or software resources that work together as a single system. A cluster may be associated with a particular region (e.g., a region may include multiple data centers). A cluster may span across multiple data centers within a region. A cluster may include one or more zones (e.g., a subnet or an individual data center).

Continuous integration 180 may include software that can work with or may be implemented on cluster infrastructure 176 to automate the process of building, testing, and integrating code changes from various developers/developer teams into a single software project. Developers/developer teams may write software code and commit changes to a shared repository using a version control system of continuous integration 180. A build service of continuous integration 180 may monitor the repository and trigger a build whenever new code changes are detected. The build service of continuous integration 180 may run unit tests, and checks for code quality, style, and security issues. If the build fails, the build service may notify the developers/developer team. If the build succeeds, the code may be integrated into the main branch of the repository.

Continuous delivery 182 may include software that can work with or may be implemented on cluster infrastructure 176 to automate the process of developing and delivering software, such as releasing new features and updates. When the build service of continuous integration 180 determines that the build is ready to be deployed, continuous delivery 182 may deploy the code to a staging environment where the code may be tested further and monitored. If the testing fails, the code may be rolled back. If the code passes the tests, continuous delivery 182 may deploy the code to a production environment.

Security 190 may implement systems and security protocols to manage user/service/application authentication and authorization to secure and protect resources in the cluster infrastructure 176. For instance, security 190 may include identities (and roles) management (e.g., to maintain a database of users/services/applications that may have certain rights in the cluster infrastructure 176). Security 190 may include authorities that can verify identities and issue tokens or certificates for authenticated users/services/applications. The authorities may revoke tokens or certificates if appropriate. Security 190 may implement authorization protocols to verify whether authenticated users/services/applications have rights to perform certain actions. Authorization protocols can allow authenticated users/services/applications to perform authorized actions and disallow those users/services/applications to perform unauthorized actions. Security 190 may implement encryption and decryption of data. Security 190 may include one or more ingress controllers. An ingress controller can process incoming data traffic and disallow data traffic that does not have a token/certificate and only allow data traffic with a valid token to pass through the ingress controller. In some cases, an ingress controller may attach application-specific tokens to the data traffic based on the destination of the data traffic. Security 190 may include a secrets manager. A secrets manager may store secrets, which may include sensitive information. A secrets manager may keep the secrets secure by controlling who or which party may access the secrets. Examples of secrets may include passwords, encryption keys, tokens, API tokens, certificates, configuration files, etc. A secrets manager may be accessed by authenticated and authorized parties only. Once authenticated, the parties may request access to secrets in accordance with security policies that may define how long the secrets may be accessed and by whom. The policies may be defined by specifying the paths to the secrets in the secrets manager and operations which may be allowed or denied by each party.

The data center 150 having cluster infrastructure 176 may be a private cloud (e.g., an enterprise network, a co-location provider network, etc.), a public cloud (e.g., an infrastructure as a service (IaaS) network, a platform as a service (PaaS) network, a software as a service (SaaS) network, or other communication service provider (CSP) network), a hybrid cloud, a multi-cloud, and so forth. The data center 150 may include cluster infrastructure 176, which can include hardware and software resources remote to the local computing system 110 for managing a fleet of AVs and AV-related services. For example, in addition to managing the AV 102, the data center 150 may also support a ridehailing/ridesharing service, a delivery service, a remote/roadside assistance service, street services (e.g., street mapping, street patrol, street cleaning, street metering, parking reservation, etc.), sensor calibration, and the like.

Cluster infrastructure 176 may include resources, such as clusters, nodes, pods deployed on nodes, etc. A cluster operator may define and provision resources in a cluster using a suitable infrastructure manager through machine-readable definition files. Applications (and services) can be deployed onto a cluster using application orchestration. Application orchestration can orchestrate deployment, maintenance, and scaling of applications on the resources in a cluster. Application orchestration can implement a control plane in the cluster that may service requests for application deployment and requests for maintaining applications running on the cluster. In some embodiments, a control plane may include persistent, lightweight, distributed key-value data store to store configuration data of the cluster, an application programming interface, a scheduler to assign unscheduled applications to a specific resource in the cluster, one or more controllers/operators each having a reconciliation loop, and a controller manager that manages the one or more controllers/operators. The control plane may orchestrate applications onto resources in the cluster, which may be organized and managed by the control plane using nodes and optionally node pools.

A cluster may have one or more nodes. A node may be a resource on which an application (e.g., systems, services, workloads, etc.) can be deployed. A node may include a virtual or physical machine. Virtual machines are machines that emulate physical machines and are implemented on physical hardware. A node has a corresponding configuration. The configuration may include properties such as a machine type, a resource type, a specific operating system image, a minimum computing platform, amount of allocable data and/or computing resources for the node (also referred to as a shape of a node), a specific network interface, maximum number of applications that can run on the node, etc. The health/status of the node may be managed by the control plane. A node pool may be a group of nodes within a cluster that all have the same configuration. A cluster may have one or more node pools.

A pod may be a unit that can be handled by the scheduler in the control plane. The control plane can schedule pods onto nodes in the cluster infrastructure. A pod may include an application (e.g., containerized application, a container, or a container application) that performs a function or provides a service. The scheduler may schedule pods to nodes or node pools based on the configurations and health/state of the nodes or node pools. The control plane may schedule and deploy one or more pods on a given node. An application can be deployed as a pod on a node in cluster infrastructure. A pod may have one or more resources provisioned for the pod, and/or one or more endpoints configured for the pod. For simplicity, nodes and node pools on which pods are deployed are not shown in the figures. In some cases, a pod may be configured to run a single application or container. In some cases, a pod may be configured to run multiple applications, or multiple containers.

Namespaces may segregate or isolate resources in a node. A namespace may have one or more pods and/or one or more other objects. Different namespaces may be assigned to different developer teams so that one developer team's work does not conflict with another developer team's work on the same node. A namespace controller can provision and manage namespaces in cluster infrastructure 176.

Workspaces may allow configuration and/or organization of parallel, distinct copies or sets of resources (e.g., clusters) in cluster infrastructure 176 to be used for different contexts or environments, e.g., deployment to development environment, deployment to staging environment, and deployment to production environment. A workspace core can allow for creation and management of different workspaces in cluster infrastructure 176.

The data center 150 may send and receive various signals to and from the AV 102 and the client computing device 170. These signals may include sensor data captured by the sensor systems 104-108, roadside assistance requests, software updates, ridesharing pick-up and drop-off instructions, and so forth.

In this example, the data center 150 includes one or more of a data management platform 152, an Artificial Intelligence/Machine-Learning (AI/ML) platform 154, a simulation platform 156, a remote assistance platform 158, a ridehailing/ridesharing platform 160, and a map management platform 162, among other systems. Many of these systems can be implemented and supported by cluster infrastructure 176.

Data management platform 152 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 may access data stored by the data management platform 152 to provide their respective services.

The AI/ML platform 154 may provide the systems for training and evaluating machine-learning algorithms for operating the AV 102 (e.g., machine-learning models used in the AV stack), the simulation platform 156, the remote assistance platform 158, the ridehailing/ridesharing platform 160, the map management platform 162, and other platforms and systems. Using the AI/ML platform 154, data scientists may prepare data sets from the data management platform 152; select, design, and train machine-learning models; evaluate, refine, and deploy the models; maintain, monitor, and retrain the models; and so on.

The simulation platform 156 may simulate (or mimic) and/or augment real-world conditions (e.g., roads, lanes, buildings, obstacles, other traffic participants (e.g., other vehicles, cyclists, and pedestrians), trees, lighting conditions, weather conditions, etc.) so that the AV stack of an AV may be tested in a virtual environment that is similar to a real physical world. The simulation platform 156 may create a virtual environment that emulates physics of the real-world and sensors of an AV. Testing and evaluating AVs in simulation platform 156 can be more efficient and allow for creation of specific traffic scenarios that may occur rarely in the real-world. Moreover, the AV stack can even be tested in thousands of scenarios in parallel in simulation. More specifically, the AV stack may be executed in a simulator simulating various traffic scenarios at a time. With simulation platform 156, the AV stack implementing the perception, prediction, planning, and control algorithms can be developed, evaluated, validated, and fine-tuned in a simulation environment. The simulation platform 156 can also be used to evaluate only a portion of the AV stack.

The remote assistance platform 158 may generate and transmit instructions to control the operation of the AV 102. For example, in response to active trigger(s) being detected by the local computing system 110 on the AV 102, the remote assistance platform 158 may respond by creating a remote assistance session with a remote assistance operator to assist the AV 102. The remote assistance platform 158 may, with assistance from the remote assistance operator, generate and transmit instructions to the AV 102 to cause the AV 102 to perform a special driving maneuver (e.g., to drive AV 102 in reverse). The remote assistance platform 158 may utilize the remote assistance session to communicate with a customer in the AV 102 via the client computing device 170 to resolve concerns of the customer.

The ridehailing/ridesharing platform 160 (e.g., a web application) may interact with a customer of a ridehailing/ridesharing service via a ridehailing/ridesharing application 172 executing on the client computing device 170. Ridehailing/ridesharing platform 160 may provide delivery services as well. The client computing device 170 may be any type of computing system, including a server, desktop computer, laptop, tablet, smartphone, smart wearable device, gaming system, or other general-purpose computing device for accessing the ridehailing/ridesharing application 172. The client computing device 170 may be a customer's mobile computing device or a computing device integrated with the AV 102 (e.g., the local computing system 110). The ridehailing/ridesharing platform 160 may receive requests to be picked up or dropped off from the ridehailing/ridesharing application 172 and dispatch the AV 102 for the trip. A similar platform can be provided for delivery services.

Map management platform 162 may provide a set of tools for the manipulation and management of geographic and spatial (geospatial) and related attribute data. The data management platform 152 may receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data may be processed, and map management platform 162 may render base representations (e.g., tiles (2D), bounding volumes (3D), etc.) of the AV geospatial data to enable users to view, query, label, edit, and otherwise interact with the data. Map management platform 162 may manage workflows and tasks for operating on the AV geospatial data. Map management platform 162 may control access to the AV geospatial data, including granting or limiting access to the AV geospatial data based on user-based, role-based, group-based, task-based, and other attribute-based access control mechanisms. Map management platform 162 may provide version control for the AV geospatial data, such as tracking specific changes that (human or machine) map editors have made to the data and to revert changes when necessary. Map management platform 162 may administer release management of the AV geospatial data, including distributing suitable iterations of the data to different users, computing devices, AVs, and other consumers of HD maps. Map management platform 162 may provide analytics regarding the AV geospatial data and related data, such as to generate insights relating to the throughput and quality of mapping tasks.

Data management platform 152, AI/ML platform 154, simulation platform 156, remote assistance platform 158, ridehailing/ridesharing platform 160, map management platform 162, applications/stacks on local computing system 110 may be developed and deployed by a number of developer teams. Lifecycles of the platforms and/or applications can be managed by continuous integration 180 and continuous delivery 182.

Exemplary CI/CD System Utilizing Cluster Groups

Figure 2:
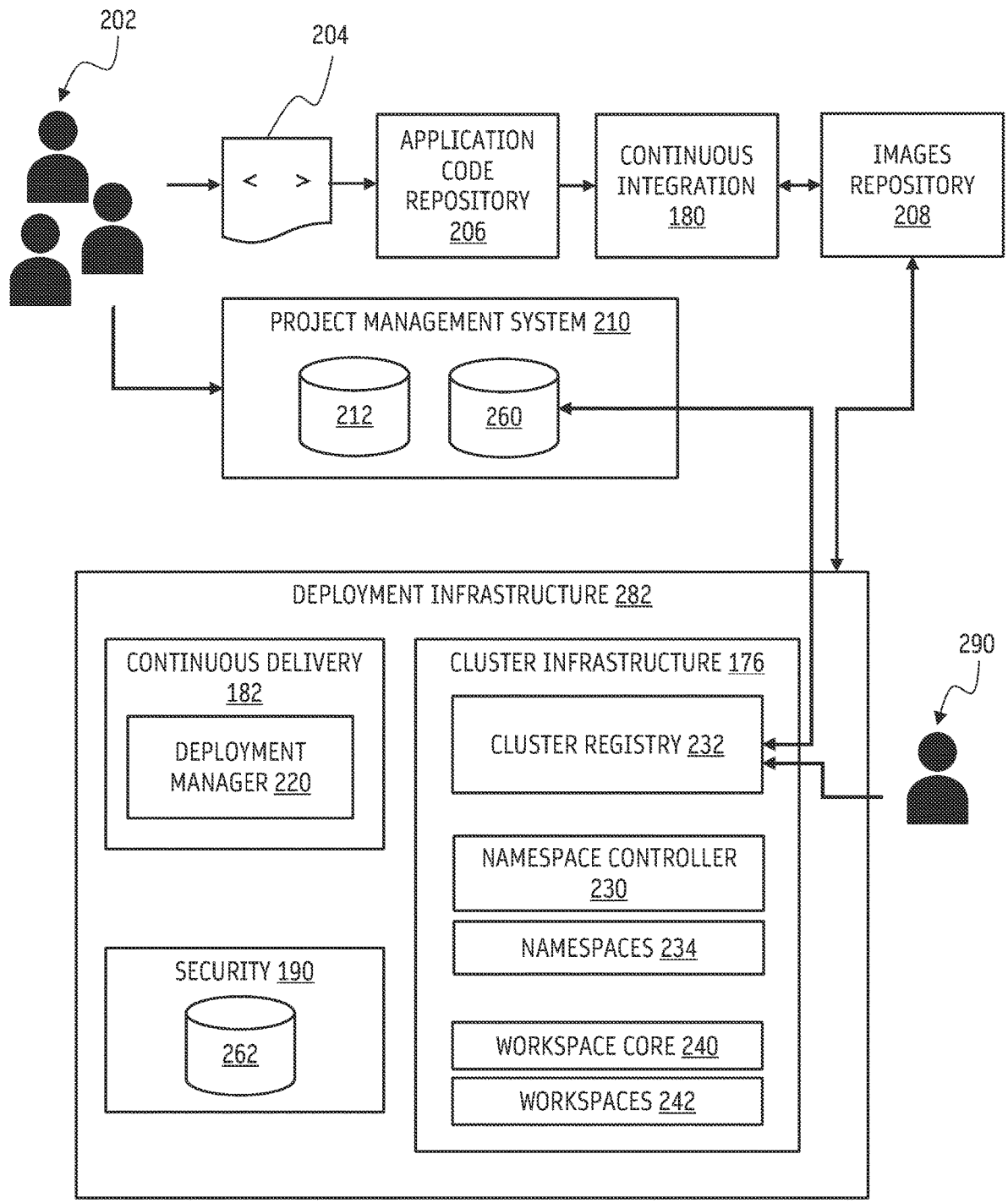
FIG. 2 illustrates an exemplary system that application developers may use to develop and deploy applications, according to some aspects of the disclosed technology.

FIG. 2 illustrates an exemplary system that application developers may use to develop and deploy applications, according to some aspects of the disclosed technology.

A developer team 202 may begin by creating a project using a project management system 210. The project may have a project name. The project may be associated with one or more software applications. Project management system 210 can coordinate and/or manage CI/CD activities and pipelines of the project. The project may have a plurality of environments (e.g., development environment, staging environment, production environment, load-testing environment, etc.). The project may have one or more stacks (e.g., default, research and development, bake, stable, etc.). The project may have one or more environment-stacks, or channels. An environment-stack or channel can specify an environment and a stack that is specific to the environment (e.g., development-default, production-research and development, production-bake, production-stable, etc.). A stack may be a flavor of an environment.

For example, developer team 202 may create a project for managing the work to be done for one or more software applications. Developer team 202 may submit a project definition to project management system 210. Project management system 210 may maintain various project definitions submitted by different developer teams such as developer team 202 in project definition store 212. Project management system 210 may help developer team 202 to plan, track, test, and document the project for the application. Project management system 210 may support developer workflows that include agile development, test case management, issue tracking, time planning, and documentation. The work to be done for one or more applications may be assisted or managed by continuous integration 180 and/or continuous delivery 182.

Developer team 202 may write code 204 and commit code 204 to application code repository 206. Continuous integration 180 may manage activities such as version control, code testing, and builds. Successful builds, e.g., images of applications that can be deployed/installed onto computing resources, may be stored and managed in images repository 208. Software build images may include files that have the compiled code and dependencies of an application. The images in images repository 208 can be deployed to resources in deployment infrastructure 282. Deployment infrastructure 282 may include resources. Resources can include clusters in cluster infrastructure 176. Resources can include AVs such as AV 102.

Continuous delivery 182 may have a deployment manager 220 that may coordinate or orchestrate one or more continuous delivery activities, such as deployment of applications, updating applications, monitoring applications, rolling back applications, etc. Project management system 210 may notify continuous delivery 182 to assist or manage one or more continuous delivery activities for the project. The one or more software applications associated with a project can be deployed onto and/or using deployment infrastructure 282. Herein, deployment infrastructure 282 may include cluster infrastructure 176. Deployment infrastructure 282 may include a plurality of AVs (e.g., different fleets of AVs operating in different areas, different models/versions of AVs, different types of AVs, etc.). For brevity, many examples described herein relate to deployment to cluster infrastructure 176. It is envisioned that the teachings are also applicable to deployment to AVs as well.

When a project is created by developer team 202, project management system 210 may provision and/or organize resources on deployment infrastructure 282 to support the project, in anticipation of the deployment of the one or more applications associated with the project. In response to receiving a project from developer team 202, project management system 210 may trigger dedicated resources to be provisioned or configured on deployment infrastructure (e.g., on the one or more clusters of the deployment infrastructure). For example, project management system 210 may trigger namespace controller 230 to provision one or more namespaces in namespaces 234 to segregate resources in deployment infrastructure 282 (e.g., cluster infrastructure 176 or a fleet of AVs) for the project. Project management system 210 may trigger workspace core 240 to create or provision one or more workspaces in workspaces 242 for the project. Project management system 210 may trigger secrets or sensitive information to be created and stored in sensitive information store 262 in security 190 for the project.

For example, the developer team 202 may request a namespace to be provisioned for the project, such as a namespace on a cluster grouping a set of resources that the developer team can manipulate for the project. Namespaces 234 can be used to segment the shared infrastructure so that resources in the shared infrastructure can be segregated and assigned to different developer teams, including developer team 202. A namespace in namespaces 234 may correspond to a project definition submitted by a developer team, e.g., developer team 202, for a project. Namespaces 234 can keep resources separate from each other, thus separate between projects and separate between developer teams. Namespace controller 230 may segregate resources in cluster infrastructure 176. Namespace controller 230 may segregate AVs in an AV fleet (not explicitly shown in FIG. 2). In some cases, namespace controller 230 may provision namespaces to segregate AVs in a fleet. Namespace controller 230 may provision namespaces 234 to divide resources into smaller containers that can have different settings and permissions. A namespace in namespaces 234 can have role-based access control (RBAC) rules, that determine who can access and manage the resources in the namespace, and what the roles can do in the namespace. Roles can be assigned to a namespace so that only parties having those roles are allowed to manipulate the resources in the namespace. The roles assigned to a namespace may have permissions which are specified for the different roles. A role may be allowed to view the namespace only. Another role may be allowed to deploy applications in the namespace. Another role may be allowed to modify resources allocated to the namespace. For example, namespaces 234 in cluster infrastructure 176 can be used to segment or isolate resources, such as pods, services, deployments, and secrets, from other namespaces, and to apply quotas and limits to them. Each resource in a namespace has a unique name that distinguishes it from other resources in the same namespace.

In some embodiments, the developer team 202 may specify different environments for the project. The environments may correspond to successive parts of a release pipeline or a deployment having different contexts. Examples of environments may include development, staging, production, load-testing, etc. An environment can include development. An environment can include staging. An environment can include production. An environment can include load-testing. An environment can include one or more of: development, staging, production, and load-testing. A development environment may be a context where developer team 202 may write and test code 204. A staging environment may be a context where developer team 202 may deploy and verify code 204 before code 204 goes to production. A production environment may be a context where code 204 is delivered to end-users and gone live. A load-testing environment may be a context where code 204 is stress-tested to expose issues. In some embodiments, the developer team 202 may specify one or more stacks for a particular environment. A stack may correspond to a collection or bundle of software components and services that provide a particular set of functionalities. A stack may correspond to a branch created from the main/default branch (e.g., feature branch, version branch, etc.). Examples of stacks may include default, research and development, bake, stable, etc. A stack can include default. A stack can include research and development. A stack can include bake. A stack can include stable. A stack can include one or more of: default, research and development, bake, and stable. For a deployment, there may be multiple environment-stacks (or channels). An environment-stack or channel may specify a combination of an environment and a stack.

Project management system 210 may create workspaces 242 that correspond to and support deployment of the project to the different environments-stack channels of the projects. The same type or set of infrastructure resources can be configured on cluster infrastructure 176 to support each environment-stack (or channels) of a particular project. Workspace core 240 may create, provision, and manage workspaces 242 that are parallel, distinct copies of infrastructure resources in cluster infrastructure 176 or deployment infrastructure 282. The copies of infrastructure resources having the same configuration can be used for deployment of the project to different environment-stacks (or channels). Workspaces 242 can be used to manage multiple deployments and/or provisioning of the same infrastructure configuration. Workspaces 242 can be used to configure the same set of infrastructure resources to multiple regions.

Project management system 210 cause sensitive information to be generated to support deployment of the project, e.g., for services to perform CI/CD actions on deployment infrastructure 282. Project management system 210 may store the sensitive information in sensitive information store 262 of a secrets manager in security 190. Sensitive information store 262 may secure sensitive information, such as secrets, API tokens, encryption keys, cryptographic certificates, passwords, and/or configuration files. Sensitive information store 262 may be queried by services, such as deployment manager 220, to obtain secrets that may be required to authenticate and/or authorize actions to be performed for the CI/CD pipeline of projects.

In some cases, a developer in developer team 202 may specify one or more destinations in deployment infrastructure (e.g., clusters in cluster infrastructure 176, or certain subsets of AVs) for deploying to a particular environment-stack. However, the developer may not be the most knowledgeable or equipped with the most up to date information about clusters in cluster infrastructure 176. The developer may have to spend time and energy to determine and select optimal clusters for deploying the application to a variety of environment-stacks or channels. It is also not practical for the developer to configure multi-region clusters in cluster infrastructure 176. In contrast, platform owners, such as platform owner 290, who are operational personnel responsible for managing resources of deployment infrastructure 282 (e.g., cluster infrastructure 176) may be more knowledgeable and equipped to configure multi-region clusters in cluster infrastructure 176 and select optimal clusters for deploying an application to a variety of environment-stacks or channels.

To facilitate deployment of projects to one or more clusters, such as multi-region clusters, platform owner 290 may define cluster groups. A cluster group may specify a name for the cluster group, a plurality of environment-stack (or channels), and one or more clusters in deployment infrastructure associated with each environment-stack (or channel). Cluster groups can establish a shared vocabulary, templates, source of truths between developer team 202 and platform owner 290.

Figure 4:
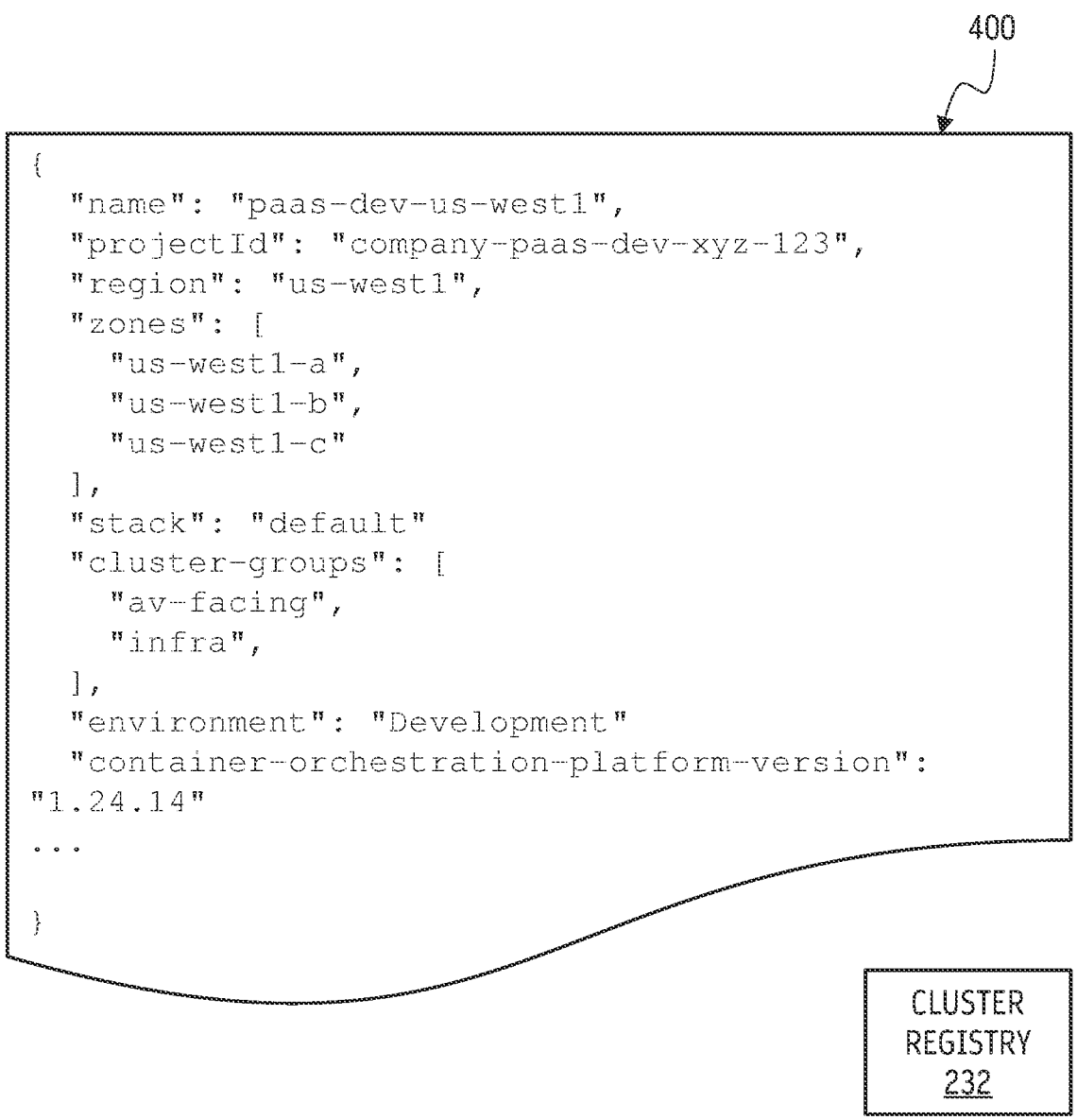
FIG. 4 illustrates exemplary metadata for a cluster in the cluster registry, according to some aspects of the disclosed technology.

Platform owner 290 may edit cluster registry 232 to create cluster groups. Cluster registry 232 may store information about clusters in cluster infrastructure 176. Cluster registry 232 may be a service that maintains/stores information or metadata about different clusters in cluster infrastructure 176. Because a cluster may belong to one or more cluster groups, the cluster registry 232 may store information or metadata on a per cluster basis. For example, cluster registry 232 may store the following information about different clusters in cluster infrastructure 176:

Name
Region
Cloud Infrastructure Provider Project
Environment (e.g., development, staging, production, load-testing, etc.)
Stack (e.g., default, research and development, bake, stable, etc.)
Uniform resource locators to logs for a particular cluster
Identifications of software running on a particular cluster
How a particular cluster is provisioned
  Identification of a cloud service provider (e.g., Google Cloud Provider, Amazon Web Services, Microsoft Azure, on-premise (private), hybrid (mix of off-premise and on-premise infrastructure), etc.)
Identifications of recent deployments occurred on a particular cluster
Identification of a manner for gaining access to the particular cluster Project management system 210 may pull routinely information about various clusters in cluster infrastructure 176. Project management system 210 may receive routinely or on certain occasions information about various clusters in cluster infrastructure 176. Exemplary information about a cluster is illustrated in FIG. 4.

Figure 6:
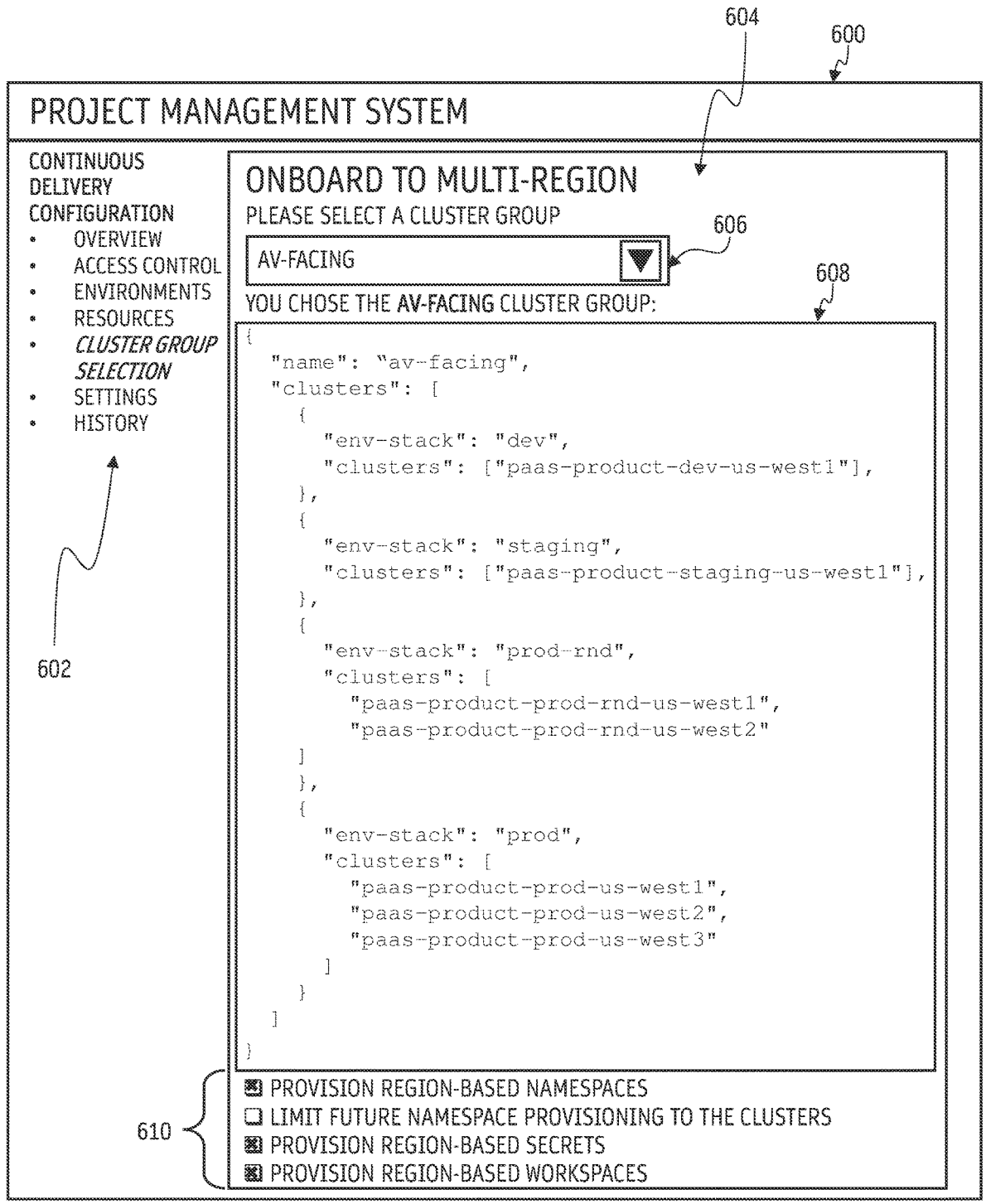
FIG. 6 illustrates an exemplary graphical user interface illustrating selection of a cluster group for a project, according to some aspects of the disclosed technology.
Figure 7:
FIG. 7 illustrates exemplary metadata for a cluster group, according to some aspects of the disclosed technology.

Project management system 210 may collate information about different clusters and form information about cluster groups. Project management system 210 may store information about one or more cluster groups in cluster group store 260. Exemplary information about cluster groups is illustrated in FIGS. 6-7.

Developer team 202 may select a cluster group to be used for deploying the project. Developer team 202 may use a graphical user interface to select the cluster group. Exemplary graphical user interface is depicted in FIG. 6. In some embodiments, developer team 202 may select or indicate a cluster group in a code file according to a particular coding language. The code file can be used to associate the project with the selected cluster group. The code file may be versioned control through an Infrastructure as Code (IaC) system (e.g., Terraform). The IaC system may provision and/or manage infrastructure according to the code file.

Figure 3:
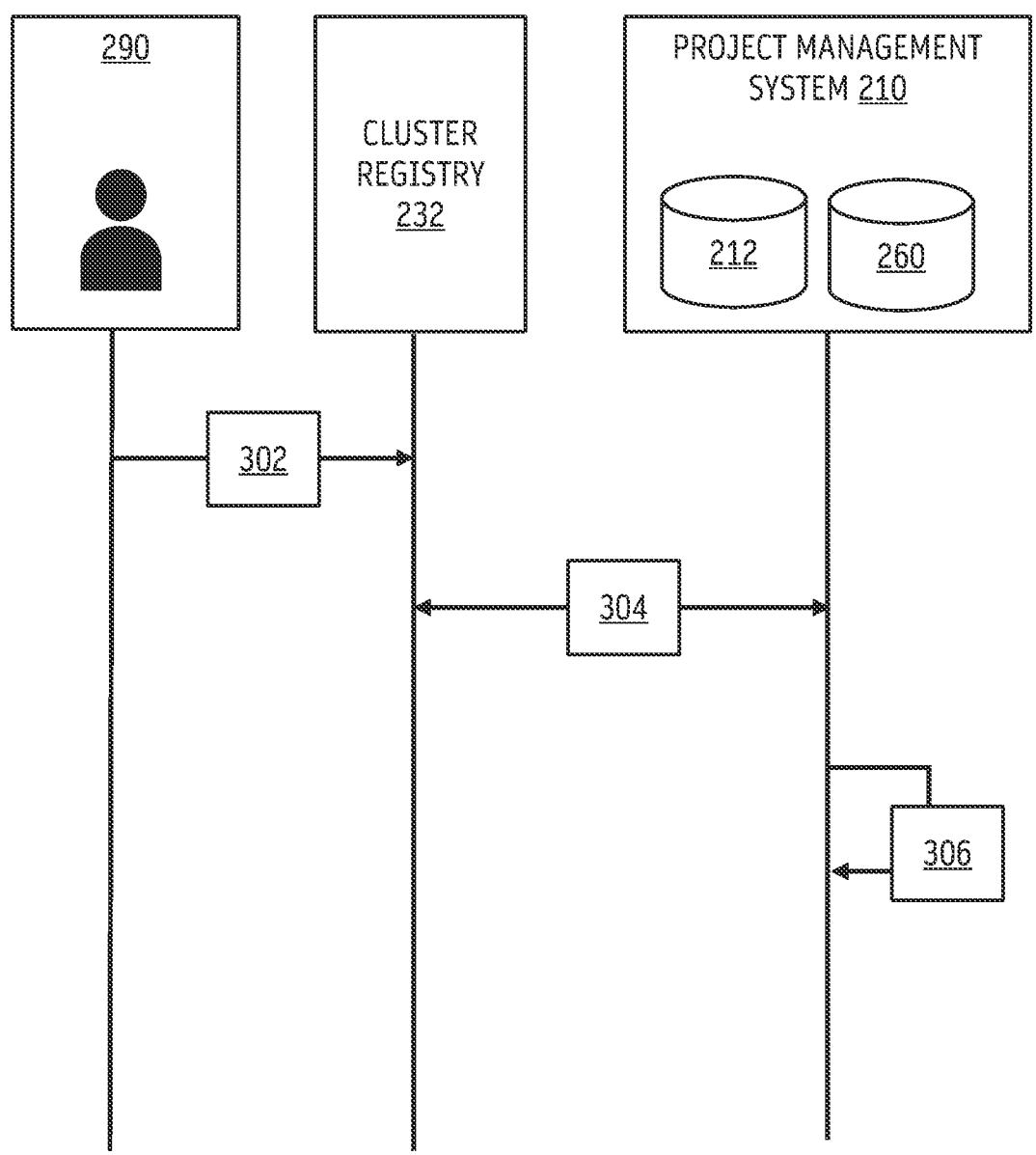
FIG. 3 illustrates an exemplary sequence diagram illustrating compilation of cluster groups, according to some aspects of the disclosed technology.

Exemplary Technique for Using the Cluster Registry and Compiling a Cluster Group FIG. 3 illustrates an exemplary sequence diagram illustrating compilation of cluster groups, according to some aspects of the disclosed technology.

In 302, platform owner 290 may write information to cluster registry 232. Platform owner 290 may view and/or edit information in cluster registry 232. For example, platform owner 290 may specify that a cluster can be used for one or more environments. Platform owner 290 may specify that a cluster can be used for one or more stacks. Platform owner can specify one or more cluster groups to which a cluster belongs.

In 304, cluster registry 232 may push information (routinely, upon request, and/or upon a change) in cluster registry 232 to project management system 210. Project management system 210 may pull information (routinely, upon request, and/or upon a change) in cluster registry 232 from cluster registry 232. Project management system 210 may receive, from cluster registry 232, information about clusters in the deployment infrastructure (deployment infrastructure 282 of FIG. 2). The information may include a name of the cluster, an environment-stack (or channel) associated with the cluster (or an environment associated with the cluster and a stack associated with the cluster), and one or more cluster groups to which the cluster belongs. An example is depicted in FIG. 4.

In 306, project management system 210 may compile information for each cluster group based on the information about the clusters. Information for each cluster group may be stored in cluster group store 260. In some cases, the information for each cluster group may be pulled from cluster registry 232 and stored cluster group store 260 (embodied as non-transitory computer-readable memory). In some cases, the information for each cluster group may be maintained/managed in cluster group store 260 (embodied as database storage or file storage). Project management system 210 may collate information about the clusters and find clusters that all belong to a particular cluster group. Clusters that belong to a particular cluster group may be sorted into different unique environment-stack (or channels) using the information about the clusters. Information about a cluster group may be organized to include:

a name of the cluster group;
a plurality of environment-stack (or channels); and
one or more clusters in deployment infrastructure associated with each environment-stack (or channel).

Examples of cluster group information are depicted in FIGS. 6-7.

FIG. 4 illustrates exemplary metadata 400 for a cluster in the cluster registry 232 according to some aspects of the disclosed technology. Metadata 400 may include a plurality of attribute-value pairs having information about a particular cluster. Metadata 400 can include a name of the cluster ("name"), e.g., "pass-dev-us-west1". The name may be descriptive about aspects of the cluster. Metadata 400 may include a project identifier ("projectId"), e.g., "company-paas-dev-xyz-123". The project identifier may identify a project that was used to create the cluster infrastructure (e.g., a project that grouped hardware and/or software resources together to form the cluster). Metadata 400 may include a region ("region"), e.g., "us-west1". The region may identify a geographical area, e.g., a city, state, region in the United States. Metadata 400 may include one or more zones ("zones"), e.g., "us-west1-a", "us-west-b", and "us-west1-b". A region may be subdivided into zones, e.g., a city, state, region in the United States. Applications deployed to a regional cluster may be replicated across all zones of a region.

Metadata 400 may include one or more stacks ("stack"), e.g., "default". The cluster may be associated with deployment to the one or more stacks. Examples of stacks may include: default, research and development ("rnd"), bake, stable, etc. Metadata 400 may include one or more environments ("environment"), e.g., "Development". Examples of stacks may include: development, staging, production, load-testing, etc. Metadata 400 may include one or more cluster groups ("cluster-groups"), e.g., "av-facing", and "infra". Platform owners may define a variety of cluster groups having different compositions of clusters. A cluster may belong to multiple cluster groups. Metadata 400 may include a container-orchestration-platform-version running on the cluster ("container-orchestration-platform-version"), e.g., "1.24.14".

Exemplary Technique for Using Cluster Group for a Project

Figure 5:
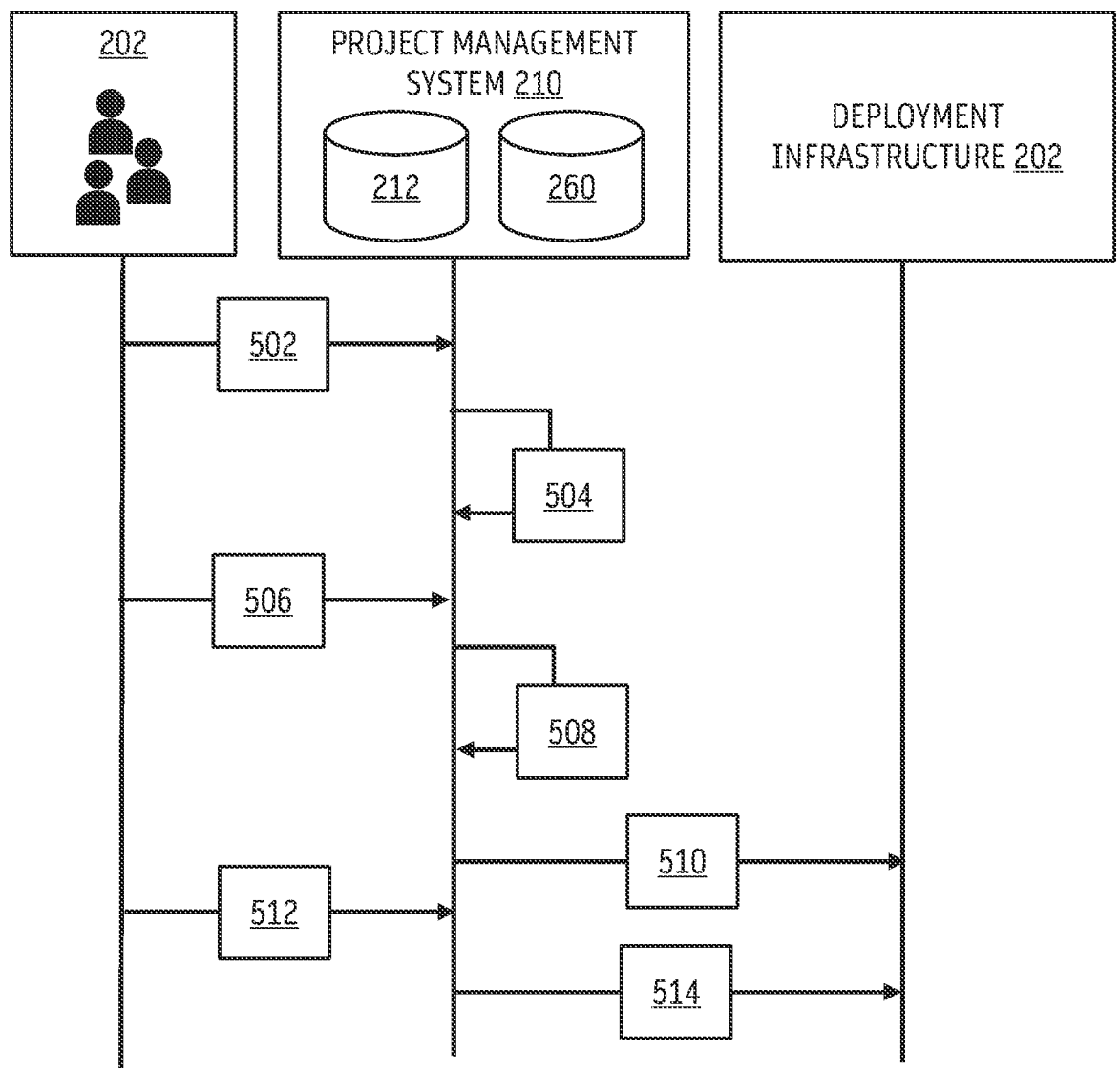
FIG. 5 illustrates an exemplary sequence diagram illustrating selection of a cluster group for a project, provisioning resources for the project, and deployment of the project according to the selected cluster group, according to some aspects of the disclosed technology.

FIG. 5 illustrates an exemplary sequence diagram illustrating selection of a cluster group for a project, provisioning resources for the project, and deployment of the project according to the selected cluster group, according to some aspects of the disclosed technology.

In 502, developer team 202 may submit a request to create a new project, or a new project definition to project management system 210. Project management system 210 may store the project definition in project definition store 212.

In 504, project management system 210 may generate a graphical user interface comprising a listing of available/usable/selectable cluster groups. The graphical user interface may be displayed or presented to a user, e.g., user in developer team 202. An exemplary graphical user interface is depicted in FIG. 6. In some cases, the graphical user interface may display information and/or metadata about different cluster groups. In some cases, project manager system 210 may include one or more computing devices (e.g., processor-based system 1000 of FIG. 10). Project manager system 210 may implement a user interface that the user may interact with. The user interface may include the graphical user interface depicted in FIG. 6. The user interface may include a command line interface.

In 506, developer team 202 (e.g., a user in developer team 202), may select a cluster group from the listing of cluster groups. Developer team 202 may input a selection of a cluster group from the listing of cluster groups. Developer team 202 may select a cluster group via the graphical user interface in 504. Developer team 202 may select a cluster group via a suitable user interface implemented by project management system 210. Project management system 210 may receive the selection via the graphical user interface. The selection may indicate that developer team 202 would like the project created in 502 to be deployed to the selected cluster group, or for the cluster group to be used for deployment of the project. In some cases, developer team 202 may provide a code file that specifies or selects the cluster group for the project.

In 508, project management system 210 may associate the project to the cluster group, e.g., in response to the selection made by developer team 202. The association with the cluster group may be stored in project definition store 212.

In 510, project management system 210 may provision dedicated resources in the deployment infrastructure for the project according to the cluster group. Project management system 210 may provision dedicated resources in the one or more clusters of the deployment infrastructure for the project according to the cluster group Project management system 210 may provision namespaces for the project on the one or more clusters associated with each environment-stack (or channel), wherein the namespaces correspond to segregated resources for the project. Project management system 210 may provision secrets usable for authenticating and/or authorizing actions associated with the deployment of the project. Project management system 210 may provision workspaces for each environment-stack (or channel) on the one or more clusters associated with each environment-stack (or channel). The workspaces can include copies of the same infrastructure configurations for the deployment of the project.

In 512, project management system 210 may receive a request to promote the project to a particular environment-stack (or channel) of the cluster group. In some cases, the request may be authorized by developer team 202. In some cases, the request is triggered by project management system 210 in response to determining that one or more gates for promoting the application to the particular environment-stack (or channel) have been passed.

In 514, project management system 210 may trigger the project (e.g., application associated with the project) to be deployed to the one or more clusters associated with the particular environment-stack (or channel).

FIG. 6 illustrates an exemplary graphical user interface 600 illustrating selection of a cluster group for a project, according to some aspects of the disclosed technology. Exemplary graphical user interface 600 may correspond to a user interface of a project management system, such as project management system 210 of FIG. 2. Exemplary graphical user interface 600 may allow a user, such as a user in developer team 202, to use and/or configure different aspects of continuous delivery. A listing of aspects is shown in area 602 of exemplary graphical user interface 600.

Area 604 of exemplary graphical user interface 600 allows the user to select a cluster group, e.g., using a drop-down menu 606. For illustration, a cluster group called "av-facing" is selected by the user.

Metadata or information about the cluster group is displayed to the user, in area 608. Information may include a name of the cluster group ("name"), e.g., "av-facing". Metadata or information may include a group of clusters that belong to the cluster group ("clusters"). Within the group of clusters are clusters which are sorted/organized/arranged according to different environment-stacks (or channels) ("env-stack"). An environment-stack (or channel) may have two or more clusters associated with the environment-stack (or channel). The two or more clusters can correspond to multiple regions or multiple regional clusters. The group of clusters may include a first environment-stack (or channel), e.g., "dev". "dev" may specify the development environment and a default stack. "dev" may have one or more clusters in the deployment infrastructure associated with "dev", e.g., "paas-product-dev-us-west1". "paas-product-dev-us-west1" can identify a regional cluster on deployment infrastructure. The group of clusters may include a second environment-stack (or channel), e.g., "staging". "staging" may specify the staging environment and a default stack. "staging" may have one or more clusters in the deployment infrastructure associated with "staging", e.g., "paas-product-staging-us-west1". "paas-product-staging-us-west1" can identify a regional cluster on deployment infrastructure. The group of clusters may include a third environment-stack (or channel), e.g., "prod-rnd". "prod-rnd" may specify the production environment and a research and development stack. "prod-rnd" may have one or more clusters in the deployment infrastructure associated with "prod-rnd", e.g., "paas-product-prod-rnd-us-west1", and "paas-product-prod-rnd-us-west2". "paas-product-prod-rnd-us-west1", and "paas-product-prod-rnd-us-west2" can identify multiple regional clusters on deployment infrastructure. The group of clusters may include a fourth environment-stack (or channel), e.g., "prod". "prod" may specify the production environment and a default stack. "prod" may have one or more clusters in the deployment infrastructure associated with "prod", e.g., "paas-product-prod-us-west1", "paas-product-prod-us-west2", and "paas-product-prod-us-west3". "paas-product-prod-us-west1", "paas-product-prod-us-west2", and "paas-product-prod-us-west3". can identify multiple regional clusters on deployment infrastructure.

One or more options may be displayed to the user in area 610 of exemplary graphical user interface 600. The user may check a box or select an option to instruct the project management system to provision namespaces to the clusters in the selected cluster group. The project management system may provision namespaces by default without the user's input. The user may check a box or select an option to instruct the project management system to limit future namespace provisioning to the clusters in the selected cluster group. The user may check a box or select an option to instruct the project management system to provision secrets. The project management system may provision secrets by default without the user's input. The user may check a box or select an option to instruct the project management system to provision workspaces. The project management system may provision workspaces by default without the user's input.

FIG. 7 illustrates exemplary metadata 700 for a cluster group, according to some aspects of the disclosed technology. Metadata 700 may include a name of the cluster group ("name"), e.g., "infra". Metadata 700 may include a group of clusters that belong to the cluster group ("clusters"). Within the group of clusters are clusters which are sorted/organized/arranged according to different environment-stacks (or channels) ("env-stack"). An environment-stack (or channel) may have two or more clusters associated with the environment-stack (or channel). The two or more clusters can correspond to multiple regions or multiple regional clusters. The group of clusters may include a first environment-stack (or channel), e.g., "dev". "dev" may specify the development environment and a default stack. "dev" may have one or more clusters in the deployment infrastructure associated with "dev", e.g., "paas-product-dev-us-central1". "paas-product-dev-us-central1" can identify a regional cluster on deployment infrastructure. The group of clusters may include a second environment-stack (or channel), e.g., "load-testing". "load-testing" may specify the load-testing environment and a default stack. "load-testing" may have one or more clusters in the deployment infrastructure associated with "load-testing", e.g., "paas-product-load-testing-us-central1", and "paas-product-load-testing-us-central2". "paas-product-load-testing-us-central1", and "paas-product-load-testing-us-central2" can identify multiple regional clusters on deployment infrastructure.

Exemplary Technique for Updating a Cluster Group

Figure 8:
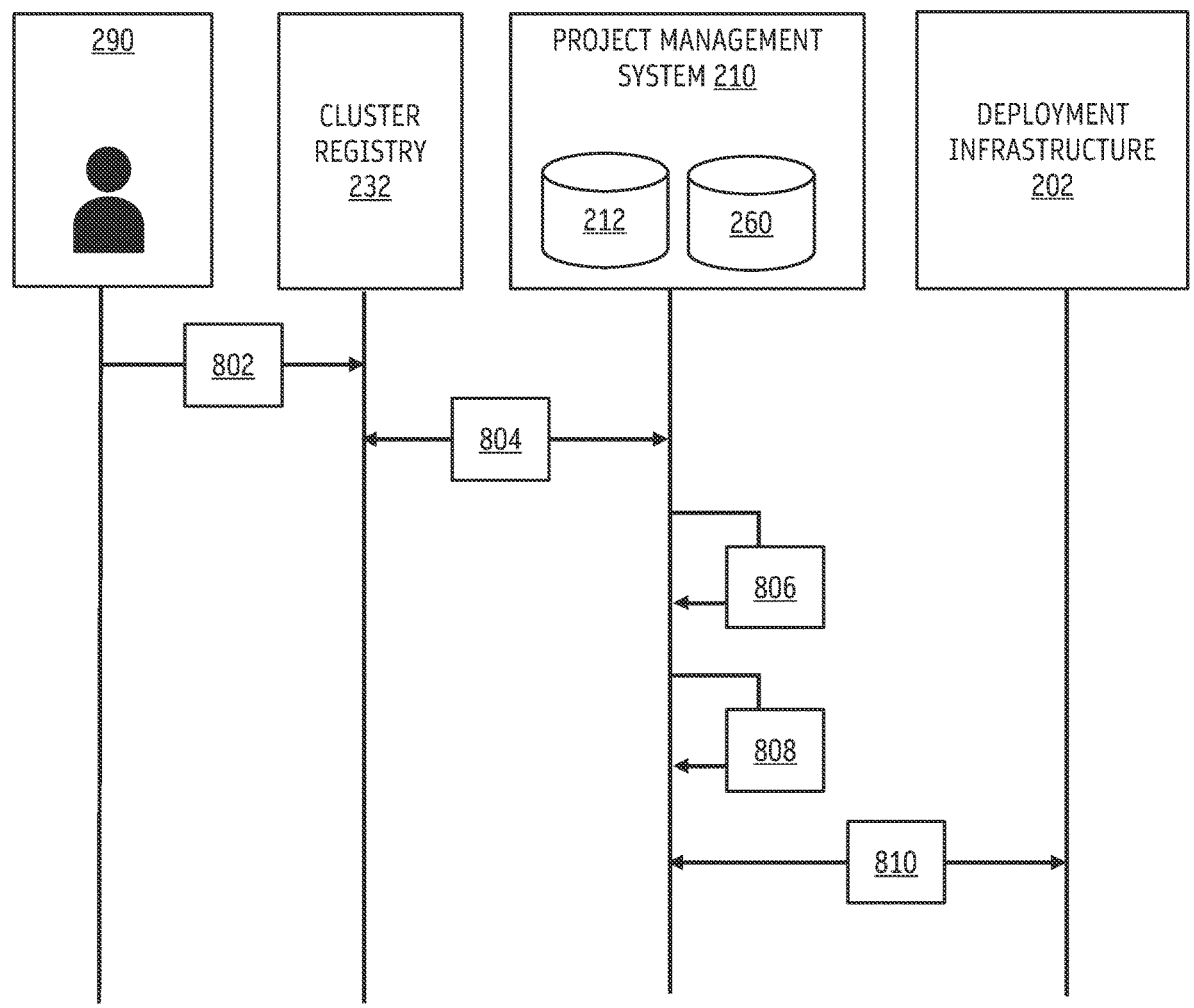
FIG. 8 illustrates an exemplary sequence diagram illustrating the project management system reconciling changes to a cluster group assigned to a project, according to some aspects of the disclosed technology.

FIG. 8 illustrates an exemplary sequence diagram illustrating the project management system reconciling changes to a cluster group assigned to a project, according to some aspects of the disclosed technology.

In 802, platform owner 290 may edit cluster registry 232 to make one or more changes to one or more cluster groups. Examples of changes may include adding a cluster to an environment-stack (or channel) of a cluster group, removing a cluster to an environment-stack (or channel) of a cluster group, adding an environment-stack (or channel) to a cluster group, and corresponding one or more clusters to the environment-stack (or channel), removing an environment-stack (or channel) from a cluster group, etc. Changes may be made by modifying metadata and/or information about individual clusters in cluster registry 232. Modifying metadata and/or information about a cluster may include, e.g., editing environment information associated with the cluster, editing stack information associated with the cluster, editing cluster group information associated with the cluster, etc.

In 804, cluster registry 232 may push information (routinely, upon request, and/or upon a change) in cluster registry 232 to project management system 210. Project management system 210 may pull information (routinely, upon request, and/or upon a change) in cluster registry 232 from cluster registry 232. Project management system 210 may receive, from cluster registry 232, information about clusters in the deployment infrastructure (deployment infrastructure 282 of FIG. 2). The information may include a name of the cluster, an environment-stack (or channel) associated with the cluster (or an environment associated with the cluster and a stack associated with the cluster), and one or more cluster groups to which the cluster belongs.

In 806, project management system 210 may detect a change in one or more cluster groups, based on information about various cluster groups in cluster group store 260. 210/may update information about cluster groups in cluster group store 260.

In 808, project management system 210 may determine from information in project definition store 212 that the change is associated with a cluster group that is assigned to an existing project. Resources may have been provisioned for the cluster group, and the provisioning may now be outdated due to the change.

In 810, project management system 210 may perform reconciliation to ensure that the provisioned resources are updated in view of the detected change. Project management system 210 may modify the dedicated resources in the deployment infrastructure for the project to reconcile the change. For instance, project management system 210 may provision and/or cordon namespaces. Project management system 210 may provision and/or cordon workspaces. Project management system 210 may provision and/or revoke secrets.

Exemplary Computer-Implemented Methods for Continuous Delivery

Figure 9:
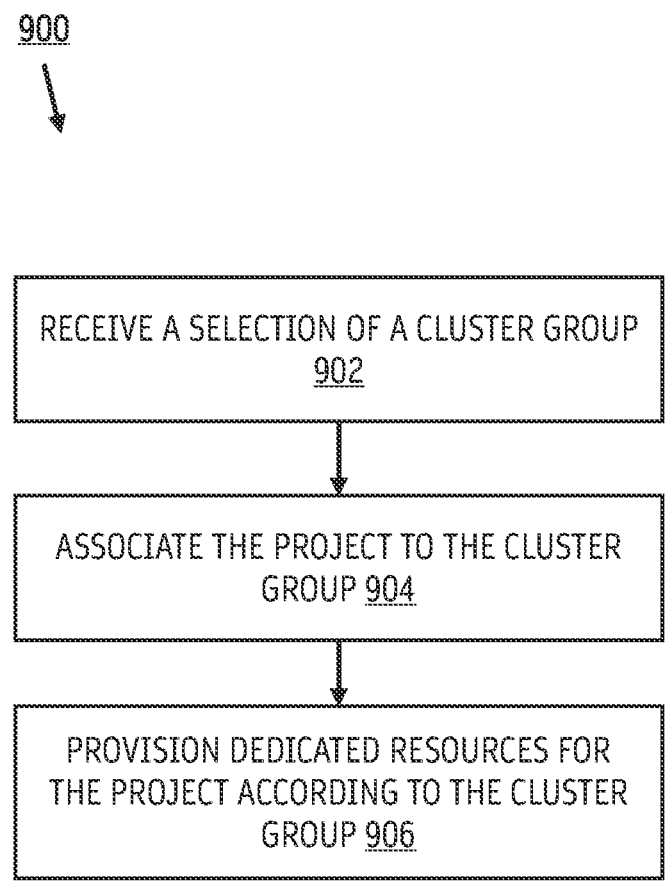
FIG. 9 is a flow diagram illustrating an exemplary computer-implemented method for continuous delivery, according to some aspects of the disclosed technology.

FIG. 9 is a flow diagram illustrating an exemplary computer-implemented method 900 for continuous delivery, according to some aspects of the disclosed technology. Various components illustrated in FIG. 2 may carry out the computer-implemented method 900. The computer-implemented method 900 may be encoded as instructions and provided in storage device 1030 of FIG. 10.

In 902, a project management system may receive a selection of a cluster group from a plurality of cluster groups to be used for deployment of a project.

In 904, the project management system may associate the project to the cluster group.

In 906, the project management system may provision dedicated resources in the deployment infrastructure for the project according to the cluster group.

Variations for Cluster Group

In various examples illustrated herein, a cluster group may include a plurality of environment-stacks (or channels). Each environment-stack (or channel) may have one or more clusters associated with the channel. An environment-stack (or channel) may specify an environment and a stack. Different environment-stacks (or channels) correspond to different parts of the deployment.

Different parts of the deployment can be organized in channels through other ways, besides using one or more of the environment and the stack. This means that cluster groups can include channels that break up deployment into parts in other logical ways. In some embodiments, the environment-stack (or channel) further specifies a cell that groups one or more of: services and data of an application. A cell may be an independently deployable, manageable, and observable unit of an application. Examples of environment-stack (or channel) may include "environment1-stack1-cell1" and "environment1-stack1-cell2". In some embodiments, the environment-stack (or channel) further specifies a feature of an application. Examples of environment-stack (or channel) may include "environment1-stack1-feature1" and "environment1-stack1-feature2".

Exemplary Processor-Based System

Figure 10:
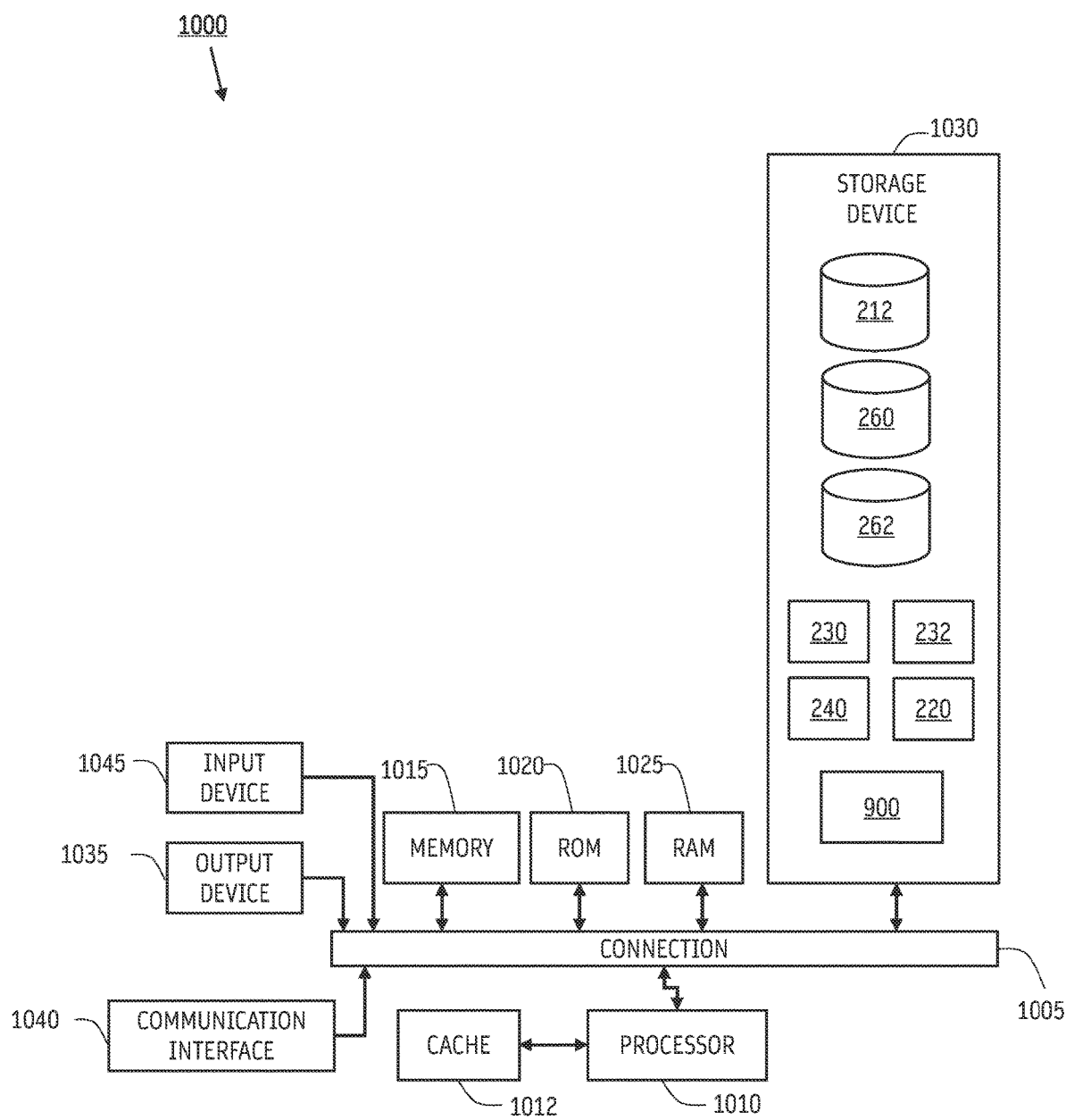
FIG. 10 illustrates an exemplary processor-based system with which some aspects of the subject technology may be implemented.

FIG. 10 illustrates an exemplary processor-based system with which some aspects of the subject technology may be implemented. For example, processor-based system 1000 may be any computing device making up, or any component thereof in which the components of the system are in communication with each other using connection 1005. Connection 1005 may be a physical connection via a bus, or a direct connection into processor 1010, such as in a chipset architecture. Connection 1005 may also be a virtual connection, networked connection, or logical connection.

In some embodiments, processor-based system 1000 represents the local computing system 110 of FIG. 1 and/or the parts of cluster infrastructure 176 in data center 150 of FIG. 1. In some embodiments, one or more of the described system components represents many such components each performing some or all of the function for which the component is described. In some embodiments, the components may be physical or virtual devices.

Exemplary system 1000 includes at least one processor 1010 (e.g., a CPU or another suitable processing unit) and connection 1005 that couples various system components including system memory 1015, such as Read-Only Memory (ROM) 1020 and Random-Access Memory (RAM) 1025 to processor 1010. Processor-based system 1000 may include a cache of high-speed memory 1012 connected directly with, in close proximity to, or integrated as part of processor 1010.

Processor 1010 may include any general-purpose processor and a hardware service or software service, such as executable instructions that implement functionalities such as methods and processes described herein. Processor 1010 may be a completely self-contained computing system, containing multiple cores or processors, a bus, memory controller, cache, etc. A multi-core processor may be symmetric or asymmetric.

To enable user interaction, processor-based system 1000 includes an input device 1045, which may represent any number of input mechanisms, such as a microphone for speech, a touch-sensitive screen for gesture or graphical input, keyboard, mouse, motion input, speech, etc. Processor-based system 1000 may also include output device 1035, which may be one or more of a number of output mechanisms known to those of skill in the art. In some instances, multimodal systems may enable a user to provide multiple types of input/output to communicate with processor-based system 1000. Processor-based system 1000 may include communications interface 1040, which may generally govern and manage the user input and system output. The communication interface may perform or facilitate receipt and/or transmission of wired or wireless communications via wired and/or wireless transceivers.

Storage device 1030 may be a non-volatile and/or non-transitory and/or computer-readable memory device and may be a hard disk or other types of computer-readable media which may store data that are accessible by a computer.

Storage device 1030 may include software services, servers, services, etc. When the code that defines such software is executed by processor 1010, the software may cause the system 1000 to perform a function. In some embodiments, a hardware service that performs a particular function may include the software component stored in a computer-readable medium in connection with the necessary hardware components, such as processor 1010, connection 1005, output device 1035, etc., to carry out the function.

One or more components illustrated in FIG. 2 may be encoded in instructions stored in storage device 1030. The instructions may be executable by the at least one processor 1010 to carry out the functionalities of the one or more components. Examples of components may include namespace controller 230, cluster registry 232, workspace core 240, and deployment manager 220.

Data in one or more stores illustrated in FIG. 2 may be stored in storage device 1030. Examples of stores may include project definition store 212, cluster group store 260, and sensitive information store 262.

Select Examples

Example 1 provides a computer-implemented method for continuous delivery, including receiving, via a user interface implemented by a computing device of a project management system, a selection of a cluster group from a plurality of cluster groups to be used for deployment of a project, where the selected cluster group specifies: a name of the selected cluster group; a plurality of environment-stacks; and one or more clusters of deployment infrastructure associated with each environment-stack; associating, by the project management system, the project to the selected cluster group; and provisioning, by the deployment infrastructure, dedicated resources in the deployment infrastructure for the project according to the selected cluster group.

Example 2 provides the computer-implemented method of example 1, where an environment-stack specifies an environment and a stack, and the plurality of environment-stacks correspond to different parts of the deployment.

Example 3 provides the computer-implemented method of example 2, where the environment includes one or more of: development, staging, production, and load-testing.

Example 4 provides the computer-implemented method of example 2 or 3, where the stack includes one of: default, research and development, bake, and stable.

Example 5 provides the computer-implemented method of any one of examples 2-4, where the environment-stack further specifies a cell that groups one or more of: services and data.

Example 6 provides the computer-implemented method of any one of examples 1-5, where an environment-stack has two or more clusters associated therewith, and the two or more clusters correspond to multiple regions.

Example 7 provides the computer-implemented method of any one of examples 1-6, further including receiving, from a cluster registry, information about clusters in the deployment infrastructure, the clusters in the deployment infrastructure including the one or more clusters specified in the selected cluster group; where the information about a particular cluster of the clusters in the deployment infrastructure includes a name of the particular cluster; an environment-stack associated with the particular cluster; and one or more cluster groups of the plurality of cluster groups to which the particular cluster belongs.

Example 8 provides the computer-implemented method of example 7, further including compiling information for the plurality of cluster groups based on the information about the clusters in the deployment infrastructure.

Example 9 provides the computer-implemented method of any one of examples 1-8, further including generating a graphical user interface including a listing of the plurality of cluster groups; where receiving the selection of the cluster group includes receiving the selection via the graphical user interface.

Example 10 provides the computer-implemented method of any one of examples 1-9, where provisioning the dedicated resources includes provisioning namespaces for the project on the one or more clusters associated with each environment-stack, where the namespaces correspond to segregated resources for the project.

Example 11 provides the computer-implemented method of any one of examples 1-10, where provisioning the dedicated resources includes provisioning secrets usable for authenticating and/or authorizing actions associated with the deployment of the project.

Example 12 provides the computer-implemented method of any one of examples 1-11, where provisioning the dedicated resources includes provisioning workspaces for each environment-stack on the one or more clusters associated with each environment-stack, where the workspaces include copies of the same infrastructure configurations for the deployment of the project.

Example 13 provides the computer-implemented method of any one of examples 1-12, further including receiving, from a cluster registry, information about clusters in the deployment infrastructure; detecting a change in the selected cluster group; and modifying the dedicated resources in the deployment infrastructure for the project to reconcile the change.

Example 14 provides the computer-implemented method of any one of examples 1-13, further including receiving a request to promote the project to a particular environment-stack of the cluster group; and triggering the project to be deployed to the one or more clusters associated with the particular environment-stack.

Example 15 provides a computer-implemented system for continuous delivery, including a project management system to: receive a selection of a cluster group from a plurality of cluster groups to be used for deployment of a project, where the selected cluster group specifies: a name of the selected cluster group; a plurality of environment-stacks; and one or more clusters in deployment infrastructure associated with each environment-stack; and associating the project to the selected cluster group; and deployment infrastructure to: provision dedicated resources in the deployment infrastructure for the project according to the selected cluster group.

Example 16 provides the computer-implemented system of example 15, where an environment-stack specifies an environment and a stack, and the plurality of environment-stacks correspond to different parts of the deployment.

Example 17 provides the computer-implemented system of example 16, where the environment includes one or more of: development, staging, production, and load-testing.

Example 18 provides the computer-implemented system of example 16 or 17, where the stack includes one or more of: default, research and development, bake, and stable.

Example 19 provides the computer-implemented system of any one of examples 16-18, where the environment-stack further specifies a cell that groups one or more of: services and data.

Example 20 provides the computer-implemented system of any one of examples 15-19, where an environment-stack has two or more clusters associated therewith, and the two or more clusters correspond to multiple regions.

Example 21 provides the computer-implemented system of any one of examples 15-20, where the project management system is further to: receive, from a cluster registry, information about clusters in the deployment infrastructure, the clusters in the deployment infrastructure including the one or more clusters specified in the selected cluster group; where the information about a particular cluster of the clusters in the deployment infrastructure includes a name of the particular cluster; an environment-stack associated with the particular cluster; and one or more cluster groups to which the particular cluster belongs.

Example 22 provides the computer-implemented system of example 21, where the project management system is further to: compiling information for the plurality of cluster groups based on the information about the clusters.

Example 23 provides the computer-implemented system of any one of examples 15-22, where the project management system is further to: generate a graphical user interface including a listing of the plurality of cluster groups; where the project management system receives the selection of the cluster group by receiving the selection via the graphical user interface.

Example 24 provides the computer-implemented system of any one of examples 15-23, where the deployment infrastructure provisions the dedicated resources by: provisioning namespaces for the project on the one or more clusters associated with each environment-stack, where the namespaces correspond to segregated resources for the project.

Example 25 provides the computer-implemented system of any one of examples 15-24, where the deployment infrastructure provisions the dedicated resources by: provisioning secrets usable for authenticating and/or authorizing actions associated with the deployment of the project.

Example 26 provides the computer-implemented system of any one of examples 15-25, where the deployment infrastructure provisions the dedicated resources by: provisioning workspaces for each environment-stack on the one or more clusters associated with each environment-stack, where the workspaces include copies of the same infrastructure configurations for the deployment of the project.

Example 27 provides the computer-implemented system of any one of examples 15-26, where the project management system is further to: receive, from a cluster registry, information about clusters in the deployment infrastructure, the clusters in the deployment infrastructure including the one or more clusters specified in the selected cluster group; detect a change in the selected cluster group; and modify the dedicated resources in the deployment infrastructure for the project to reconcile the change.

Example 28 provides the computer-implemented system of any one of examples 15-27, where the project management system is further to: receive a request to promote the project to a particular environment-stack of the cluster group; and trigger the project to be deployed to the one or more clusters associated with the particular environment-stack.

Example 29 provides one or more non-transitory computer-readable media storing instructions that, when executed by one or more processors, cause the one or more processors to: receive a selection of a cluster group from a plurality of cluster groups to be used for deployment of a project, where the cluster group specifies: a name of the cluster group; a plurality of environment-stacks; and one or more clusters in deployment infrastructure associated with each environment-stack; associate the project to the cluster group; and provision dedicated resources in the deployment infrastructure for the project according to the cluster group.

Example 30 provides the one or more non-transitory computer-readable media of example 29, where an environment-stack specifies an environment and a stack, and the plurality of environment-stacks correspond to different parts of the deployment.

Example 31 provides the one or more non-transitory computer-readable media of example 30, where the environment includes one or more of: development, staging, production, and load-testing.

Example 32 provides the one or more non-transitory computer-readable media of example 30 or 31, where the stack includes one or more of: default, research and development, bake, and stable.

Example 33 provides the one or more non-transitory computer-readable media of any one of examples 30-32, where the environment-stack further specifies a cell that groups one or more of: services and data.

Example 34 provides the one or more non-transitory computer-readable media of any one of examples 29-33, where an environment-stack has two or more clusters associated therewith, and the two or more clusters correspond to multiple regions.

Example 35 provides the one or more non-transitory computer-readable media of any one of examples 29-34, where the instructions, when executed by the one or more processors, further cause the one or more processors to: receive, from a cluster registry, information about clusters in the deployment infrastructure, the clusters in the deployment infrastructure including the one or more clusters specified in the selected cluster group, where the information about a particular cluster of the clusters in the deployment infrastructure includes a name of the particular cluster; an environment-stack associated with the particular cluster; and one or more cluster groups to which the particular cluster belongs.

Example 36 provides the one or more non-transitory computer-readable media of example 35, where the instructions, when executed by the one or more processors, further cause the one or more processors to: compile information for the plurality of cluster groups based on the information about the clusters.

Example 37 provides the one or more non-transitory computer-readable media of any one of examples 29-36, where the instructions, when executed by the one or more processors, further cause the one or more processors to: generate a graphical user interface including a listing of the plurality of cluster groups; where receiving the selection of the cluster group includes receiving the selection via the graphical user interface.

Example 38 provides the one or more non-transitory computer-readable media of any one of examples 29-37, where provisioning the dedicated resources includes provisioning namespaces for the project on the one or more clusters associated with each environment-stack, where the namespaces correspond to segregated resources for the project.

Example 39 provides the one or more non-transitory computer-readable media of any one of examples 29-38, where provisioning the dedicated resources includes provisioning secrets usable for authenticating and/or authorizing actions associated with the deployment of the project.

Example 40 provides the one or more non-transitory computer-readable media of any one of examples 29-39, where provisioning the dedicated resources includes provisioning workspaces for each environment-stack on the one or more clusters associated with each environment-stack, where the workspaces include copies of the same infrastructure configurations for the deployment of the project.

Example 41 provides the one or more non-transitory computer-readable media of any one of examples 29-40, where the instructions, when executed by the one or more processors, further cause the one or more processors to: receive, from a cluster registry, information about clusters in the deployment infrastructure; detect a change in the selected cluster group; and modify the dedicated resources in the deployment infrastructure for the project to reconcile the change.

Example 42 provides the one or more non-transitory computer-readable media of any one of examples 29-41, where the instructions, when executed by the one or more processors, further cause the one or more processors to: receiving a request to promote the project to a particular environment-stack of the selected cluster group; and triggering the project to be deployed to the one or more clusters associated with the particular environment-stack.

Example 43 is an apparatus comprising means to carry out or means for carrying out any one of the computer-implemented methods of Examples 1-14.

Variations and Other Notes

Although the various operations shown in and described with reference to FIGS. 3, 5, 8 and 9 are illustrated as occurring once each and in a particular order, it will be recognized that the operations may be performed in any suitable order and repeated as desired. Additionally, one or more operations may be performed in parallel. Furthermore, the operations illustrated in FIGS. 3, 5, 8 and 9 may be combined or may include more or fewer details than described.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

The detailed description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the detailed description.

For purposes of explanation, specific numbers, materials and configurations are set forth in order to provide a thorough understanding of the illustrative implementations. However, it will be apparent to one skilled in the art that the present disclosure may be practiced without the specific details and/or that the present disclosure may be practiced with only some of the described aspects. In other instances, well known features are omitted or simplified in order not to obscure the illustrative implementations.

Further, references are made to the accompanying drawings that form a part hereof, and in which are shown, by way of illustration, embodiments that may be practiced. It is to be understood that other embodiments may be utilized, and structural or logical changes may be made without departing from the scope of the present disclosure. Therefore, the detailed description is not to be taken in a limiting sense.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A or B" or the phrase "A and/or B" means (A), (B), or (A and B). For the purposes of the present disclosure, the phrase "A, B, or C" or the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value as described herein or as known in the art. Similarly, terms indicating orientation of various elements, e.g., "coplanar," "perpendicular," "orthogonal," "parallel," or any other angle between the elements, generally refer to being within +/−5-20% of a target value as described herein or as known in the art.

In addition, the terms "comprise," "comprising," "include," "including," "have," "having" or any other variation thereof, are intended to cover a non-exclusive inclusion. For example, a method, process, or device, that comprises a list of elements is not necessarily limited to only those elements but may include other elements not expressly listed or inherent to such method, process, or device. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description and the accompanying drawings.

What is claimed is:

1. A computer-implemented method for continuous delivery, comprising:
   receiving, via a user interface implemented by a computing device of a project management system, a selection of a cluster group from a plurality of cluster groups to be used for deployment of a project, wherein the selected cluster group specifies:
   a name of the selected cluster group;
   a plurality of environment-stacks; and
   one or more clusters in deployment infrastructure associated with each environment-stack;
   associating, by the project management system, the project to the selected cluster group; and
   provisioning, by the deployment infrastructure, dedicated resources in the deployment infrastructure for the project according to the selected cluster group.

2. The computer-implemented method of claim 1, wherein an environment-stack specifies an environment and a stack, and the environment-stacks correspond to different parts of the deployment.

3. The computer-implemented method of claim 2, wherein the environment comprises one or more of: development, staging, production, and load-testing.

4. The computer-implemented method of claim 2, wherein the stack comprises one or more of: default, research and development, bake, and stable.

5. The computer-implemented method of claim 2, wherein the environment-stack further specifies a cell that groups one or more of: services and data.

6. The computer-implemented method of claim 1, wherein an environment-stack has two or more clusters associated therewith, and the two or more clusters correspond to multiple regions.

7. The computer-implemented method of claim 1, further comprising:
receiving, from a cluster registry, information about clusters in the deployment infrastructure, the clusters in the deployment infrastructure including the one or more clusters specified in the selected cluster group;
wherein the information about a particular cluster of the clusters in the deployment infrastructure comprises:
a name of the particular cluster;
an environment-stack associated with the particular cluster; and
one or more cluster groups of the plurality of cluster groups to which the particular cluster belongs.

8. The computer-implemented method of claim 7, further comprising:
compiling information for the plurality of cluster groups based on the information about the clusters in the deployment infrastructure.

9. The computer-implemented method of claim 1, further comprising:
generating a graphical user interface comprising a listing of the plurality of cluster groups;
wherein receiving the selection of the cluster group comprises receiving the selection via the graphical user interface.

10. The computer-implemented method of claim 1, wherein provisioning the dedicated resources comprises:
provisioning namespaces for the project on the one or more clusters associated with each environment-stack, wherein the namespaces correspond to segregated resources for the project.

11. The computer-implemented method of claim 1, wherein provisioning the dedicated resources comprises:
provisioning secrets usable for authenticating and/or authorizing actions associated with the deployment of the project.

12. The computer-implemented method of claim 1, wherein provisioning the dedicated resources comprises:
provisioning workspaces for each environment-stack on the one or more clusters associated with each environment-stack, wherein the workspaces comprise copies of the same infrastructure configurations for the deployment of the project.

13. The computer-implemented method of claim 1, further comprising:
receiving, from a cluster registry, information about clusters in the deployment infrastructure;
detecting a change in the selected cluster group; and
modifying the dedicated resources in the deployment infrastructure for the project to reconcile the change.

14. The computer-implemented method of claim 1, further comprising:
receiving a request to promote the project to a particular environment-stack of the cluster group; and
triggering the project to be deployed to the one or more clusters associated with the particular environment-stack.

15. A computer-implemented system for continuous delivery, comprising:
a processor; and
a memory unit storing instructions that when executed by the processor, cause the computer-implemented system to implement:
a project management system to:
receive a selection of a cluster group from a plurality of cluster groups to be used for deployment of a project, wherein the selected cluster group specifies:
a name of the selected cluster group;
a plurality of environment-stacks; and
one or more clusters in deployment infrastructure associated with each environment-stack; and
associating the project to the selected cluster group; and
a deployment infrastructure to:
provision dedicated resources in the deployment infrastructure for the project according to the selected cluster group;
wherein the environment-stacks correspond to different parts of the deployment, and an environment-stack has two or more clusters associated therewith, and the two or more clusters correspond to multiple regions.

16. The computer-implemented system of claim 15, wherein the project management system is further to:
receive, from a cluster registry, information about clusters in the deployment infrastructure, the clusters in the deployment infrastructure including the one or more clusters specified in the selected cluster group;
wherein the information about a particular cluster of the clusters in the deployment infrastructure comprises:
a name of the particular cluster;
an environment-stack associated with the particular cluster; and
one or more cluster groups of the plurality of cluster groups to which the particular cluster belongs; and
compiling information for the plurality of cluster groups based on the information about the clusters.

17. The computer-implemented system of claim 15, wherein the project management system is further to:
generate a graphical user interface comprising a listing of the plurality of cluster groups;
wherein the project management system receives the selection of the cluster group by receiving the selection via the graphical user interface.

18. The computer-implemented system of claim 15, wherein the deployment infrastructure provisions the dedicated resources by:
provisioning namespaces for the project on the one or more clusters associated with each environment-stack, wherein the namespaces correspond to segregated resources for the project;
provisioning secrets usable for authenticating and/or authorizing actions associated with the deployment of the project; and
provisioning workspaces for each environment-stack on the one or more clusters associated with each environment-stack, wherein the workspaces comprise copies of the same infrastructure configurations for the deployment of the project.

19. The computer-implemented system of claim 15, wherein the project management system is further to:
receive, from a cluster registry, information about clusters in the deployment infrastructure;
detect a change in the selected cluster group; and
modify the dedicated resources in the deployment infrastructure for the project to reconcile the change.

20. One or more non-transitory computer-readable media storing instructions that, when executed by one or more processors, cause the one or more processors to:

receive a selection of a cluster group from a plurality of cluster groups to be used for deployment of a project, wherein the selected cluster group specifies:
   a name of the selected cluster group;
   a plurality of environment-stacks; and
   one or more clusters in deployment infrastructure associated with each environment-stack;

associate the project to the selected cluster group;

provision dedicated resources in the deployment infrastructure for the project according to the selected cluster group;

receiving a request to promote the project to a particular environment-stack of the selected cluster group; and triggering the project to be deployed to the one or more clusters associated with the particular environment-stack.

\* \* \* \* \*